UNITED STATES PATENT OFFICE 2,395,566

PROCESS OF MANUFACTURING POTASSIUM PENTABORATE

Frank Henderson May, Trona, Calif., assignor to American Potash & Chemical Corporation, Trona, Calif., a corporation of Delaware No Drawing. Application October 22, 1943, Serial No. 507,299

5 Claims. (Cl. 23—59)

This invention relates to a process for manufacturing pure potassium pentaborate octohydrate ($K_2B_{10}O_{16}.8H_2O$).

The general object of the present invention is to provide a process for producing pure potassium pentaborate in a single operation using cheap commercial chemical reagents, to wit borax, potassium chloride, carbon dioxide, and water. Under certain conditions, waste flue gases may be used in the process of the present invention as the source of carbon dioxide. When these reagents are contacted, the following reaction may take place:

$$4KCl + 5Na_2B_4O_7.10H_2O + 6CO_2 = 2K_2B_{10}O_{16}.8H_2O + 6NaHCO_3 + 4NaCl + 31H_2O$$

The foregoing reaction is an equilibrium reaction which does not go to completion, and the process of the present invention is designed to permit the simultaneous separation of the produced potassium pentaborate octohydrate. I have discovered that this may be accomplished by controlling the addition of the reagents for the reaction in the following manner:

The amount of water employed in the process should be less than sufficient to dissolve the solid reagents of the reaction previous to the completion of the addition of carbon dioxide. The amount of water employed may be sufficient to dissolve all the potassium chloride to be utilized or sufficient to dissolve all the potassium chloride soluble after the water has dissolved borax, but the amount of water employed is insufficient to dissolve, previous to the carbonation operation, all of the borax employed for the reaction. The reaction should be conducted by carbonating a sludge consisting of undissolved borax and an aqueous phase which has dissolved the potassium chloride and part of the borax, and which is preferably kept substantially saturated with borax throughout the carbonating reaction. A further precaution in the process of the present invention which must normally be preserved is that all of the borax for the reaction should not be added at the start of the reaction since a sludge too thick to be properly manipulated would result. Therefore, in the process of the present invention only part of the borax is added at the start, the resulting sludge being carbonated while the remaining borax for the process should be added either continuously or stepwise during the carbonation procedure. The amount of borax added in the process should be further regulated so that at the end of the carbonation operation all of the borax will be dissolved and reacted in part, and a product produced consisting of a sludge, of which the solid phase is pure potassium pentaborate octohydrate ($K_2B_{10}O_{16}.8H_2O$) and the liquid phase is a mother liquor containing potassium and sodium, bicarbonates, borates, and chlorides.

The process of the present invention will be more fully understood from the following description of a number of preferred forms or examples of processes embodying the present invention.

As a first example of the operation of my process, I add 7.3 pounds of potassium chloride (KCl) to 100 pounds of water. There is also added 50 pounds of borax ($Na_2B_4O_7.10H_2O$). The borax is added to the potassium chloride solution just prepared, but it ordinarily should not be added all at once. To keep the mixture from becoming too thick, I prefer to add about one-half of the borax to the solution at the start and the remainder either continuously or stepwise as the carbonation reaction proceeds. During the carbonation reaction, however, care should be exercised to see that a sufficient borax is maintained, so that the solution is substantially saturated with respect to borax during the reaction. The amount of borax specified is selected so that at the end of the carbonation reaction no solid borax will be present.

Having prepared a potassium chloride (KCl) solution and added borax, I then proceed to carbonate the sludge to convert borax and potassium chloride into potassium pentaborate. In this example, 5.4 pounds of carbon dioxide should be absorbed by the solution. This will result in the precipitation of pure potassium pentaborate ($K_2B_{10}O_{16}.8H_2O$). The carbonation is preferably conducted in a closed carbonating apparatus which should be fitted with a suitable stirring and agitating mechanism, and which should be sufficiently strong and rugged to allow the full agitation of the rather heavy sludge, as well as sufficiently rugged to withstand pressures above atmospheric. At the end of the carbonating reaction, which may be conducted at about 35° C., the partial pressure of carbon dioxide over the product is 660 mm. Hg. During the carbonating reaction, pressures of carbon dioxide over the mixtures should be of considerably greater magnitude than the foregoing value.

In the example described, 13.6 pounds of potassium pentaborate octohydrate

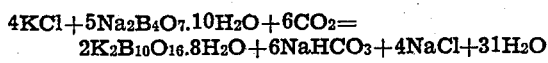

($K_2B_{10}O_{16}.8H_2O$)

is precipitated and obtained as a sludge with a liquor which holds in solution all of the other ingredients added and formed during the process. The potassium pentaborate octohydrate is then separated from the mother liquor either by filtration, settling, centrifuging, or the like, and should be given a light wash or purge to free the crystals from the contaminating mother liquor, and then dried.

I prefer to employ the centrifugal process of separation, and in such process the water employed for washing the centrifugal cake should be collected separately from the main body of the end liquor, and the wash water then used to supply part of the 100 pounds of water employed at the start of the next operation. In calculating the ingredients to be added for the next batch, allowance (subtraction) is, of course, made for any end liquor that may be admixed with such salvaged purge water. Presence of a little end liquor is not harmful, but it can not be counted as a make-up water.

In the foregoing example of my process, there is a recovery of about 47% potassium employed and about 44% of the boron employed. The remaining values are retained in the end liquor. From the end liquor the values may be salvaged, but I prefer to utilize the end liquor in a process for producing a mixed crystal crop containing potassium pentaborate octohydrate and sodium bicarbonate in the manner more particularly described in the process of my copending application, Serial No. 507,300, filed October 22, 1943, now Patent No. 2,374,877, granted May 1, 1945.

The process of the present invention may be carried out at a greater potassium concentration in the reacting liquors with an advantage with respect to certain factors. I have found that the carbonation reaction is more easily conducted where greater concentrations of potassium chloride are maintained. A second example of the process of the present invention, particularly designed to incorporate this advantage, is as follows:

To 100 pounds of water I add 40 pounds of potassium chloride (KCl). This amount of potassium chloride is substantially all of the potassium chloride which may be dissolved in the quantity of water in question, even in the presence of borax. In this example, I employ 60 pounds of borax ($Na_2B_4O_7.10H_2O$). This borax is added to the potassium chloride solution in the manner previously discussed; that is to say, a part—for example about one-half or even less—of the borax is added before the start of the carbonation reaction in order that the sludge produced will not be too thick for efficient handling during the carbonating procedure. The sludge is then carbonated, during which the remaining borax is added either continuously or stepwise. Again, in this example, I have stated substantially the precise amount of borax which will be dissolved by the solution at the completion of the carbonating step.

In the carbonating step there should be added 4.9 pounds of carbon dioxide, which when absorbed and reacted serves to precipitate pure potassium pentaborate octohydrate

($K_2B_{10}O_{16}.8H_2O$)

The partial pressure of carbon dioxide at the end of this carbonating operation is only about 70 mm. Hg at 35° C. By comparison with the previous example where the partial pressure of carbon dioxide at the end of the operation was 660 mm. Hg at 35° C., it may be apparent how the use of higher concentrations of potassium chloride facilitates the carbonation operation by reducing the pressures required. In this example of my process, the carbonation may be readily carried out using flue gas as a source of carbon dioxide without requiring high pressures to be employed during the process.

In the second example of my process, there is obtained a yield of about 16.6 pounds of

$K_2B_{10}O_{16}.8H_2O$ which, as before, is separated from the end liquor. The separation is preferably conducted in a centrifuge and the precipitate is preferably given a water wash or purge in a centrifugal machine to free the crop of end liquor. In this example of my process, the recovery of boron is about the same as in the preceding example—that is, about one-half of the added borax is recovered as potassium pentaborate octohydrate, although the recovery of the potassium values is considerably less than in the case of the preceding example. The end liquor may then be delivered to a process for recovering such values. The foregoing two examples illustrate valuable applications of my process, and indicate substantially the limits of desirable operation. As shown by these examples, for each 100 pounds of water employed in the process, potassium chloride may be employed in quantity as low as about 7 pounds and as high as about 40 pounds per 100 pounds of water. My process may be carried out using any desired addition of potassium chloride within these limits, i. e., additions, for example, of 16, 23, or 31 pounds of potassium chloride per 100 pounds of water. As the potassium chloride additions are varied, it is not necessary to vary the additions of the other two reagents to any great extent. However, it is advisable to observe a rough proportionality, that is to say, for additions of potassium chloride intermediate the 7 and 40 pounds per 100 pounds of water, additions of borax proportionately between the requirements of 50 pounds of borax at the 7 pound KCl addition and 60 pounds of borax at the 40 pound KCl addition are advisable. Likewise, the inverse carbon dioxide requirement of from between 5.4 pounds to 4.9 pounds may be observed when employing additions of potassium chloride intermediate the values of 7 pounds and 40 pounds described in the two examples of my process.

When operating within these limits, I have experienced very little trouble in obtaining pure crops of $K_2B_{10}O_{16}.8H_2O$. If, however, an analysis of the potassium pentaborate crop obtained shows minor impurities due to the failure of the solution to dissolve all of the borax added or from other causes, this condition may be quickly and easily corrected by the addition of a small amount of water—seldom more than 10% of that originally added. Even a 10% water addition will reduce the yield of the process very little; in the last example, for instance, only about 3%. Obviously, if the contamination proves to be borax, a slight reduction in the borax addition should be followed in the subsequent operations.

It is to be understood, of course, that the conversion of potassium chloride to potassium pentaborate by interaction with carbon dioxide and borax produces sodium chloride (NaCl) in solution. However, in the directions given, there is no possibility of sodium chloride reaching sufficient concentration to precipitate in the process and thus contaminate the potassium pentaborate crop.

While I prefer to employ pure reagents, free of sodium chloride, it is possible in the process to produce potassium pentaborate octohydrate from KCl which is contaminated with some sodium chloride. Such added sodium chloride will dissolve in the end liquors and not contaminate the product, $K_2B_{10}O_{16}.8H_2O$. Where potassium chloride contains appreciable sodium chloride as an impurity, this added sodium chloride in the liquors depresses the solubility of borax and sodium bicarbonate (the latter being formed during the carbonation operation), and, therefore, less borax and more water must be employed to obtain a pure crop of potassium pentaborate under such conditions. Consequently, it may be said that the presence of sodium chloride as an impurity in the reagents employed results in the decrease in the yield product, $K_2B_{10}O_{16}.8H_2O$.

The process of the present invention provides a most economical process for producing potassium pentaborate from cheap or relatively inexpensive chemicals.

In my copending applications Serial Nos. 460,278, filed September 30, 1942; 462,425, filed October 17, 1942; 466,675, filed November 23, 1942, and 507,298, filed October 22, 1943, I have described cyclic processes designed to produce carbon dioxide by absorption of carbon dioxide while precipitating potassium pentaborate octohydrate to form a sludge and thereafter heating the sludge to cause the precipitated pentaborate to be redissolved with the recovery of the absorbed carbon dioxide.

In my copending application Serial No. 507,300, filed October 22, 1943, I have described a process for the formation and recovery of a mixture of crystals of potassium pentaborate octohydrate and sodium bicarbonate. Increasing the amount of $CO_2$ absorbed in the process of this application would result in a precipitation of sodium bicarbonate as taught in said last-mentioned copending application. The process of the present application is intended to precipitate pentaborate only, to produce a substantially pure product.

While the particular examples here given are well adapted to carry out the objects of the present invention, it will be understood that various modifications and changes may be made, and this invention is of the scope set forth in the appended claims.

I claim:

1. A process of manufacturing potassium pentaborate octohydrate, which comprises adding potassium chloride and borax to water and carbonating the resulting sludge, the amount of borax added being in excess of that soluble in the water previous to the carbonating operation, precipitating potassium pentaborate octohydrate during the carbonation operation, the extent of carbonation being limited to prevent the precipitation of sodium bicarbonate and to insure precipitation substantially only of said potassium pentaborate octohydrate, and separating the precipitate from the mother liquor.

2. A process of manufacturing potassium pentaborate octohydrate, which comprises adding potassium chloride and borax to water and carbonating the sludge, the amount of borax added being in excess of that soluble in the water previous to the carbonating operation, part of the borax being added during carbonation, sufficient borax being maintained present to hold the solution during carbonation substantially saturated with sodium tetraborate, precipitating potassium pentaborate octohydrate during carbonation, the extent of carbonation being limited to prevent the precipitation of sodium bicarbonate and to insure precipitation substantially only of said potassium pentaborate octohydrate, and separating the precipitate from the resulting mother liquor.

3. A process of manufacturing potassium pentaborate octohydrate, which comprises adding potassium chloride and borax to water and carbonating the resulting sludge, the amount of borax added being in excess of that soluble in the water previous to the carbonating operation, the carbonation operation being limited to prevent the precipitation of sodium bicarbonate and to precipitate potassium pentaborate octohydrate only, and continued until all borax is in solution, thereafter separating the pure potassium pentaborate octohydrate from the resulting mother liquor.

4. A process of manufacturing potassium pentaborate octohydrate, which comprises adding potassium chloride and borax to water and carbonating the resulting sludge, between about 7 and 40 parts of potassium chloride being added to 100 parts of water, between 50 and 60 parts of borax being added per 100 parts of water, and between about 5.4 and 4.9 parts of carbon dioxide being added during the carbonation operation, the amount of carbon dioxide added being thus limited so as to prevent the precipitation of sodium bicarbonate and to precipitate only pure potassium pentaborate octohydrate during the carbonation operation, and separating the precipitate from the mother liquor.

5. A process of manufacturing potassium pentaborate octohydrate, which comprises adding potassium chloride and borax to water, carbonating the resulting sludge, the amount of potassium chloride added being between 7 and 40 parts per 100 parts of water, the amount of borax added being between 50 and 60 parts per 100 parts of water, the amount of carbon dioxide added being between 5.4 and 4.9 parts per 100 parts of water, a part of the borax being added during the carbonation operation while maintaining the solution during carbonation substantially saturated with sodium tetraborate, the amount of carbon dioxide added being thus limited so as to prevent the precipitation of sodium bicarbonate and to precipitate only potassium pentaborate octohydrate during the carbonation operation, and separating the precipitate from the resulting solution.

FRANK HENDERSON MAY.